United States Patent
Kageyama et al.

(10) Patent No.: US 10,858,127 B2
(45) Date of Patent: Dec. 8, 2020

(54) COMBINATION WEIGHING DEVICE WITH CONTROL UNIT FOR TARGETED WEIGHT CONVEYANCE

(71) Applicant: Ishida Co., Ltd., Kyoto (JP)

(72) Inventors: Toshiharu Kageyama, Ritto (JP);
Hideshi Miyamoto, Ritto (JP);
Michihiko Yonetsu, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 182 days.

(21) Appl. No.: 16/068,329

(22) PCT Filed: Dec. 15, 2016

(86) PCT No.: PCT/JP2016/087424
§ 371 (c)(1),
(2) Date: Jul. 5, 2018

(87) PCT Pub. No.: WO2017/119257
PCT Pub. Date: Jul. 13, 2017

(65) Prior Publication Data
US 2019/0023429 A1  Jan. 24, 2019

(30) Foreign Application Priority Data
Jan. 7, 2016 (JP) ................. 2016-001572

(51) Int. Cl.
*B65B 1/32* (2006.01)
*G01G 19/393* (2006.01)
*G01G 19/08* (2006.01)
*G01G 19/387* (2006.01)
*G01G 13/08* (2006.01)

(52) U.S. Cl.
CPC ............. *B65B 1/32* (2013.01); *G01G 19/387* (2013.01); *G01G 19/393* (2013.01); *G01G 13/08* (2013.01)

(58) Field of Classification Search
CPC .... G01G 13/08; G01G 19/387; G01G 19/393; B65B 1/32
See application file for complete search history.

(56) References Cited

U.S. PATENT DOCUMENTS 5,753,867 A * 5/1998 Konishi ............... G01G 19/393
177/25.18
7,790,990 B2 * 9/2010 Kieselhorst .......... G01G 19/393
177/25.18

FOREIGN PATENT DOCUMENTS

| CN | 1366173 A | 8/2002 |
|---|---|---|
| CN | 1420342 A | 5/2003 |
| CN | 101460379 A | 6/2009 |

(Continued)

OTHER PUBLICATIONS

The extended European search report issued by the European Patent Office dated May 22, 2019, which corresponds to EP16883757.3-1001 and is related to U.S. Appl. No. 16/068,329.

(Continued)

*Primary Examiner* — Randy W Gibson
(74) *Attorney, Agent, or Firm* — Studebaker & Brackett PC

(57) ABSTRACT

In a combination weighing apparatus, a control unit executes combination weighing processing with a second value used as a target weighing value after controlling all of the hoppers so as to discharge the article while leaving the article in the conveying unit when the second value is less than a first value in a case where the target weighing value is changed from the first value to the second value.

8 Claims, 2 Drawing Sheets

(56) References Cited

FOREIGN PATENT DOCUMENTS

| | | |
|---|---|---|
| CN | 101576398 A | 11/2009 |
| CN | 202915995 U | 5/2013 |
| CN | 103958075 A | 7/2014 |
| CN | 104303029 A | 1/2015 |
| CN | 104931122 A | 9/2015 |
| EP | 2 141 467 A1 | 1/2010 |
| JP | S59-198324 A | 11/1984 |
| JP | S62-022028 A | 1/1987 |
| JP | H07-063599 A | 3/1995 |
| JP | H07-198464 A | 8/1995 |
| JP | 2010-175391 A | 8/2010 |
| JP | 4804810 B2 | 11/2011 |

OTHER PUBLICATIONS

International Search Report issued in PCT/JP2016/087424; dated Feb. 28, 2017.
An Office Action mailed by the State Intellectual Property Office of the People's Republic of China dated Sep. 26, 2019, which corresponds to Chinese Patent Application No. 201680077869.3 and is related to U.S. Appl. No. 16/068,329.
International Preliminary Report on Patentability issued in corresponding International Application No. PCT/JP2016/087424; dated Jul. 19, 2018.
An Office Action; "Notice of Reasons for Refusal," mailed by the Japanese Patent Office dated May 12, 2020, which corresponds to Japanese Patent Application No. 2017-560079 and is related to U.S. Appl. No. 16/068,329; with English language translation.

\* cited by examiner

COMBINATION WEIGHING DEVICE WITH CONTROL UNIT FOR TARGETED WEIGHT CONVEYANCE

TECHNICAL FIELD

The present disclosure relates to a combination weighing apparatus.

BACKGROUND ART

A combination weighing apparatus disclosed in, for example, Patent Literature 1 is provided with a conveying unit that conveys an article, a plurality of hoppers that temporarily stores the article conveyed by the conveying unit, and a weighing unit that weighs a weighing value corresponding to the mass of the article stored in the hopper. In this combination weighing apparatus, combination weighing processing is executed. In the combination weighing processing, a weighing value combination is selected, such that a total value becomes a target weighing value, from a plurality of the weighing values weighed by the weighing unit and associated respectively with the plurality of hoppers and the hopper corresponding to the combination discharges the article. When the type of the article is changed, total discharge processing in which the conveying unit and all of the hoppers discharge the article is executed, and then the combination weighing processing is executed.

CITATION LIST

Patent Literature

Patent Literature 1: Japanese Patent No. 4804810

SUMMARY OF INVENTION

Technical Problem

In the combination weighing apparatus as described above, the target weighing value may be changed to a value less than the current value with the type of the article remaining the same during, for example, setup change from a big bag product to a small bag product. In this case, the article that is suitable for the production of the big bag product is stored in the hopper, and thus overscale or the like may occur and the selection of an appropriate weighing value combination may be impossible when the combination weighing processing is executed with the value less than the current value used as the target weighing value. Here, the overscale or the like means a case where, for example, the combination of the mass of the articles staying in the plurality of hoppers is not included in a predetermined range based on the preset target weighing value. In another case, the overscale or the like means a case where the mass value of the article staying in one hopper exceeds a predetermined range based on a target value relating to the combination. It is conceivable to execute the combination weighing processing after the execution of the above-described total discharge processing in order to avoid such a situation. However, the loss of the article may increase if the total discharge processing is performed as described above.

An object of the present disclosure is to provide a combination weighing apparatus with which the loss of the article can be reduced in a case where the target weighing value is changed to a value less than the current value.

Solution to Problem

A combination weighing apparatus according to an aspect of the present disclosure includes a conveying unit that conveys an article, a plurality of hoppers that temporarily stores the article conveyed by the conveying unit, a weighing unit that weighs a weighing value corresponding to the mass of the article stored in the hopper, and a control unit that executes combination weighing processing for selecting a weighing value combination, such that a total value becomes a target weighing value, from a plurality of the weighing values weighed by the weighing unit and associated respectively with the plurality of hoppers and controlling the hopper corresponding to the combination so as to discharge the article, in which the control unit executes the combination weighing processing with a second value used as the target weighing value after controlling all of the hoppers so as to discharge the article while leaving the article in the conveying unit when the second value is less than a first value in a case where the target weighing value is changed from the first value to the second value.

In this combination weighing apparatus, all of the hoppers discharge the article with the article remaining in the conveying unit when the second value is less than the first value in a case where the target weighing value is changed from the first value to the second value. As a result, the article remaining in the conveying unit can be used when the combination weighing processing is resumed with the second value used as the target weighing value. Therefore, with this combination weighing apparatus, the loss of the article can be reduced in a case where the target weighing value is changed to a value less than the current value.

In the combination weighing apparatus according to an aspect of the present disclosure, the control unit may control all of the hoppers so as to discharge the article while leaving the article in the conveying unit when the second value is less than the first value in a case where the target weighing value is changed from the first value to the second value with the type of the article remaining the same. In this case, the loss of the article can be reduced in a case where the target weighing value is changed to a value less than the current value with the type of the article remaining the same. In the present disclosure, the type of the article being the same means that at least the properties affecting the delivery force of the conveying unit of the properties relating to the article are the same. For example, in a case where the article is seasoned snack food, the type of the article may be regarded as being different, regardless of the same shape or the like, when a spice relating to seasoning differs. In addition, in a case where the article is meat, the type of the article may be regarded as being different when the size differs.

In the combination weighing apparatus according to an aspect of the present disclosure, the control unit may execute the combination weighing processing with the second value used as the target weighing value when the second value is greater than the first value in a case where the target weighing value is changed from the first value to the second value. In this case, the article remaining in the conveying unit and the article stored in the hopper can be used when the combination weighing processing is resumed with the second value used as the target weighing value.

In the combination weighing apparatus according to an aspect of the present disclosure, the control unit may execute the combination weighing processing after controlling the conveying unit and all of the hoppers so as to discharge the article in a case where the type of the article is changed. In this case, mixing between different types of the articles can be suppressed.

In the combination weighing apparatus according to an aspect of the present disclosure, the control unit may output a signal for packaging the article discharged from all of the hoppers, to a packaging machine packaging the article discharged from the hopper corresponding to the combination when the second value is less than the first value in a case where the target weighing value is changed from the first value to the second value. In this case, the article discharged from all of the hoppers can be packaged in the packaging machine.

In the combination weighing apparatus according to an aspect of the present disclosure, the control unit may decrease a delivery force of the conveying unit when the second value is less than the first value in a case where the target weighing value is changed from the first value to the second value. In this case, the article can be conveyed to the hopper by an appropriate amount in accordance with the second value.

A combination weighing apparatus according to an aspect of the present disclosure includes a conveying unit that conveys an article, a plurality of hoppers that temporarily stores the article conveyed by the conveying unit, a weighing unit that weighs a weighing value corresponding to the mass of the article stored in the hopper, and a control unit that executes combination weighing processing for selecting a weighing value combination, such that a total value becomes a target weighing value, from a plurality of the weighing values weighed by the weighing unit and associated respectively with the plurality of hoppers and controlling the hopper corresponding to the combination so as to discharge the article, in which the control unit executes the combination weighing processing with a second value used as the target weighing value after controlling the hoppers consistent with a preset condition so as to discharge the article while leaving the article in the conveying unit when the second value is less than a first value in a case where the target weighing value is changed from the first value to the second value.

In this combination weighing apparatus, the article is discharged to the hopper consistent with the preset condition with the article remaining in the conveying unit when the second value is less than the first value in a case where the target weighing value is changed from the first value to the second value. As a result, the article remaining in the conveying unit and the article stored in the hopper not discharging the article can be used when the combination weighing processing is resumed with the second value used as the target weighing value. Accordingly, with this combination weighing apparatus, the loss of the article can be reduced in a case where the target weighing value is changed to a value less than the current value.

In the combination weighing apparatus according to an aspect of the present disclosure, the control unit may select the hopper for discharging the article based on comparison between a target value set for the hopper in a case where the target weighing value is the second value and the weighing value of the hopper when the second value is less than the first value in a case where the target weighing value is changed from the first value to the second value. In this case, the hopper for discharging the article can be appropriately selected.

Advantageous Effects of Invention

According to the present disclosure, the loss of the article can be reduced in a case where the target weighing value is changed to a value less than the current value.

DESCRIPTION OF EMBODIMENTS

Figure 1:
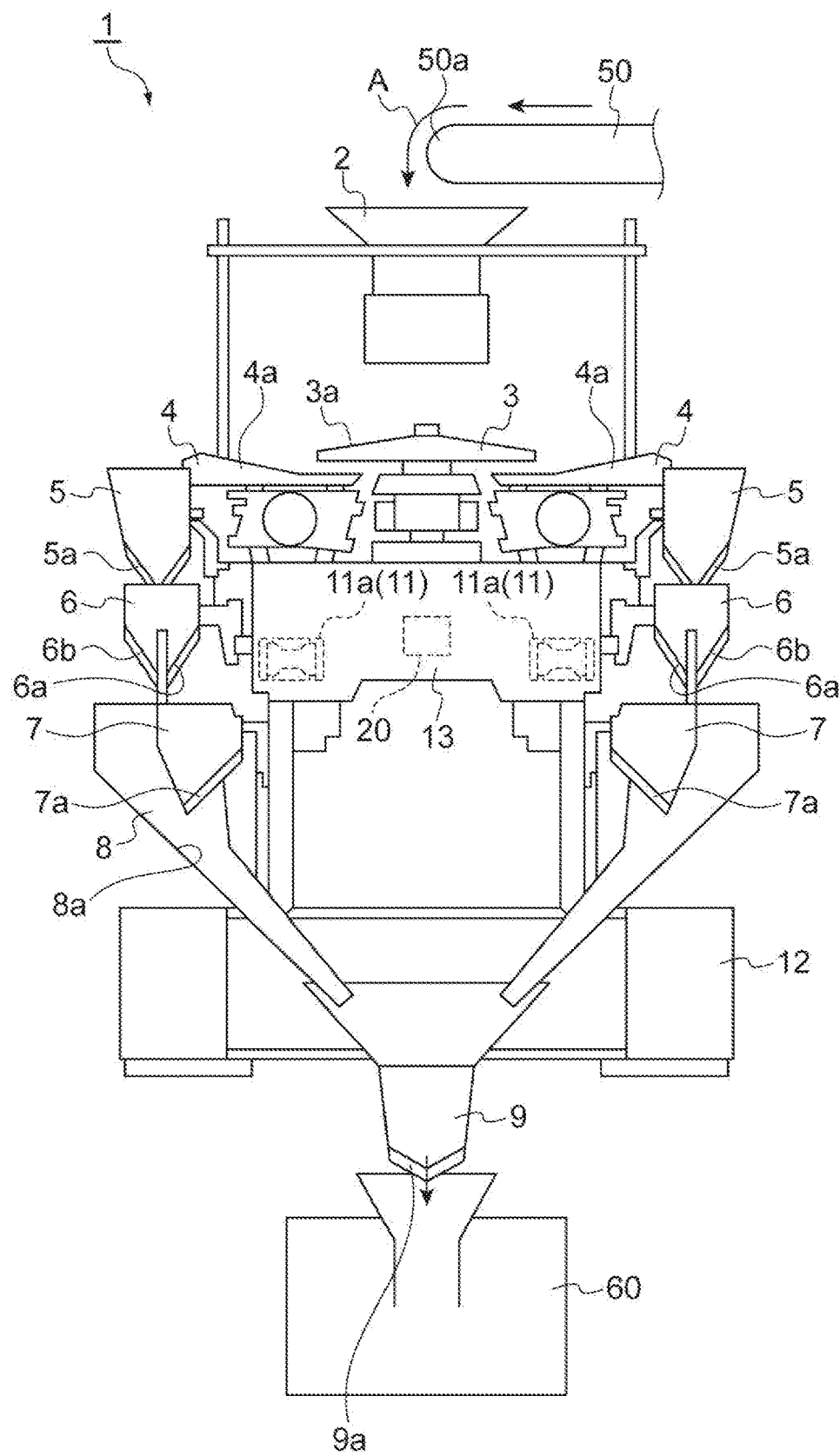
FIG. 1 is a configuration diagram of a combination weighing apparatus according to an embodiment of the present disclosure.

Hereinafter, an embodiment of the present disclosure will be described in detail with reference to accompanying drawings. In the drawings, the same reference numerals will be used to refer to the same or equivalent parts so that the same description is not repeated.

As illustrated in FIG. 1, a combination weighing apparatus 1 is provided with an input chute 2, a distribution feeder (conveying unit) 3, a plurality of radiation feeders (conveying units) 4, a plurality of pool hoppers 5, a plurality of weighing hoppers (hoppers) 6, a plurality of booster hoppers (hoppers) 7, a collecting chute 8, a timing hopper 9, a weighing unit 11, and a control unit 20. The combination weighing apparatus 1 weighs an article A (article that has a variation in single mass such as an agricultural product, a marine product, and processed food) supplied by a transport conveyor 50 such that a target weighing value is met and supplies the article A to a bag-making packaging machine 60. The bag-making packaging machine 60 bags the article A weighed and supplied by the combination weighing apparatus 1 while molding a film into a bag with a predetermined capacity.

The input chute 2 is disposed below a conveyance end 50a of the transport conveyor 50. The input chute 2 receives the article A falling from the conveyance end 50a of the transport conveyor 50 and discharges the article A downward.

The distribution feeder 3 is disposed below the input chute 2. The distribution feeder 3 has a conical conveyance surface 3a spreading downward. By vibrating the conveyance surface 3a, the distribution feeder 3 uniformly conveys the article A discharged from the input chute 2 to the top portion of the conveyance surface 3a toward the outer edge of the conveyance surface 3a.

The plurality of radiation feeders 4 are radially disposed along the outer edge of the conveyance surface 3a of the distribution feeder 3. Each radiation feeder 4 has a trough 4a extending to the outside from below the outer edge of the conveyance surface 3a. By vibrating the trough 4a, each radiation feeder 4 conveys the article A discharged from the outer edge of the conveyance surface 3a toward the tip portion of the trough 4a.

The delivery force of the distribution feeder 3 and the radiation feeder 4 is controlled by the control unit 20 (described later). Here, the delivery force is the amplitude of vibration in the conveyance surface 3a and the trough 4a. When the delivery force is small, the amplitude decreases and the amount by which the article A is conveyed decreases. When the delivery force is large, the amplitude increases and the amount by which the article A is conveyed increases.

Each pool hopper 5 is disposed below the tip portion of the trough 4a of each radiation feeder 4. Each pool hopper 5 has a gate 5a openable and closable with respect to the bottom portion thereof. By the gate 5a being closed, each pool hopper 5 temporarily stores the article A discharged from the tip portion of the corresponding trough 4a. In addition, by the gate 5a being opened, each pool hopper 5 discharges the temporarily stored article A downward.

Each weighing hopper 6 is disposed below the gate 5a of each pool hopper 5. Each weighing hopper 6 has a gate 6a and a gate 6b openable and closable with respect to the bottom portion thereof. By the gate 6a and the gate 6b being closed, each weighing hopper 6 temporarily stores the article A discharged from the corresponding pool hopper 5. In addition, by the gate 6a or the gate 6b being opened, each weighing hopper 6 discharges the temporarily stored article A downward.

Each booster hopper 7 is disposed below the gate 6a of each weighing hopper 6. Each booster hopper 7 has a gate 7a openable and closable with respect to the bottom portion thereof. By the gate 7a being closed, each booster hopper 7 temporarily stores the article A discharged from the gate 6a side of the corresponding weighing hopper 6. In addition, by the gate 7a being opened, each booster hopper 7 discharges the temporarily stored article A downward.

The collecting chute 8 has a tubular configuration that has a truncated cone-shaped inner surface 8a tapering downward. The collecting chute 8 is disposed such that the inner surface 8a is positioned below all of the weighing hoppers 6 and the booster hoppers 7. The collecting chute 8 receives the article A discharged from the gate 6b side of each weighing hopper 6 and the article A discharged from each booster hopper 7 with the inner surface 8a and discharges the article A downward.

The timing hopper 9 is disposed below the collecting chute 8. The timing hopper 9 has a gate 9a openable and closable with respect to the bottom portion thereof. By the gate 9a being closed, the timing hopper 9 temporarily stores the article A discharged from the collecting chute 8. In addition, by the gate 9a being opened, the timing hopper 9 discharges the temporarily stored article A to the bag-making packaging machine 60.

The weighing unit 11 is disposed in a case 13 supported by a frame 12. The weighing unit 11 has a plurality of load cells 11a. Each load cell 11a supports the corresponding weighing hopper 6. When the article A is temporarily stored in each weighing hopper 6, the weighing unit 11 weighs a weighing value that corresponds to the mass of the article A.

The control unit 20 is disposed in the case 13. The control unit 20 has a central processing unit (CPU), a read only memory (ROM), a random access memory (RAM), and so on. The control unit 20 controls the operation of each part of the combination weighing apparatus 1 such as the convey operation of the distribution feeder 3 and the radiation feeder 4, the operation for opening and closing the gate 5a of each pool hopper 5, the operation for opening and closing the gate 6a and the gate 6b of each weighing hopper 6, the operation for opening and closing the gate 7a of each booster hopper 7, and the gate 9a of each timing hopper 9. The control unit 20 is connected to the bag-making packaging machine 60 in a communicable manner.

The control unit 20 stores the weighing value weighed by the weighing unit 11 and the weighing hopper 6 and/or the booster hopper 7 storing the article A corresponding to the weighing value in association with each other. Specifically, when the article A weighed by the weighing unit 11 is stored in the weighing hopper 6, the control unit 20 stores the weighing value weighed by the weighing unit 11 and the weighing hopper 6 storing the article A corresponding to the weighing value in association with each other. When the article A weighed by the weighing unit 11 is discharged to the booster hopper 7 corresponding to the weighing hopper 6, the control unit 20 stores the weighing value of the article A weighed by the weighing unit 11 and the booster hopper 7 corresponding to the weighing hopper 6 in association with each other.

The control unit 20 selects a weighing value combination, from a plurality of the weighing values weighed by the weighing unit 11 and associated respectively with the plurality of weighing hoppers 6 and/or the plurality of booster hoppers 7, such that the total value becomes the target weighing value. Specifically, the control unit 20 selects the weighing value combination, from the plurality of weighing values output by the weighing unit 11, such that the total value falls within a predetermined range in which the target weighing value is the lower limit value. Subsequently, the control unit 20 controls the weighing hopper 6 and/or the booster hopper 7 corresponding to the combination so as to discharge the article A. This serial processing will be referred to as combination weighing processing below.

The input chute 2, the distribution feeder 3, the plurality of radiation feeders 4, the plurality of pool hoppers 5, and the plurality of weighing hoppers 6 are directly or indirectly supported by the case 13. The plurality of booster hoppers 7, the collecting chute 8, and the timing hopper 9 are directly or indirectly supported by the frame 12.

Figure 2:
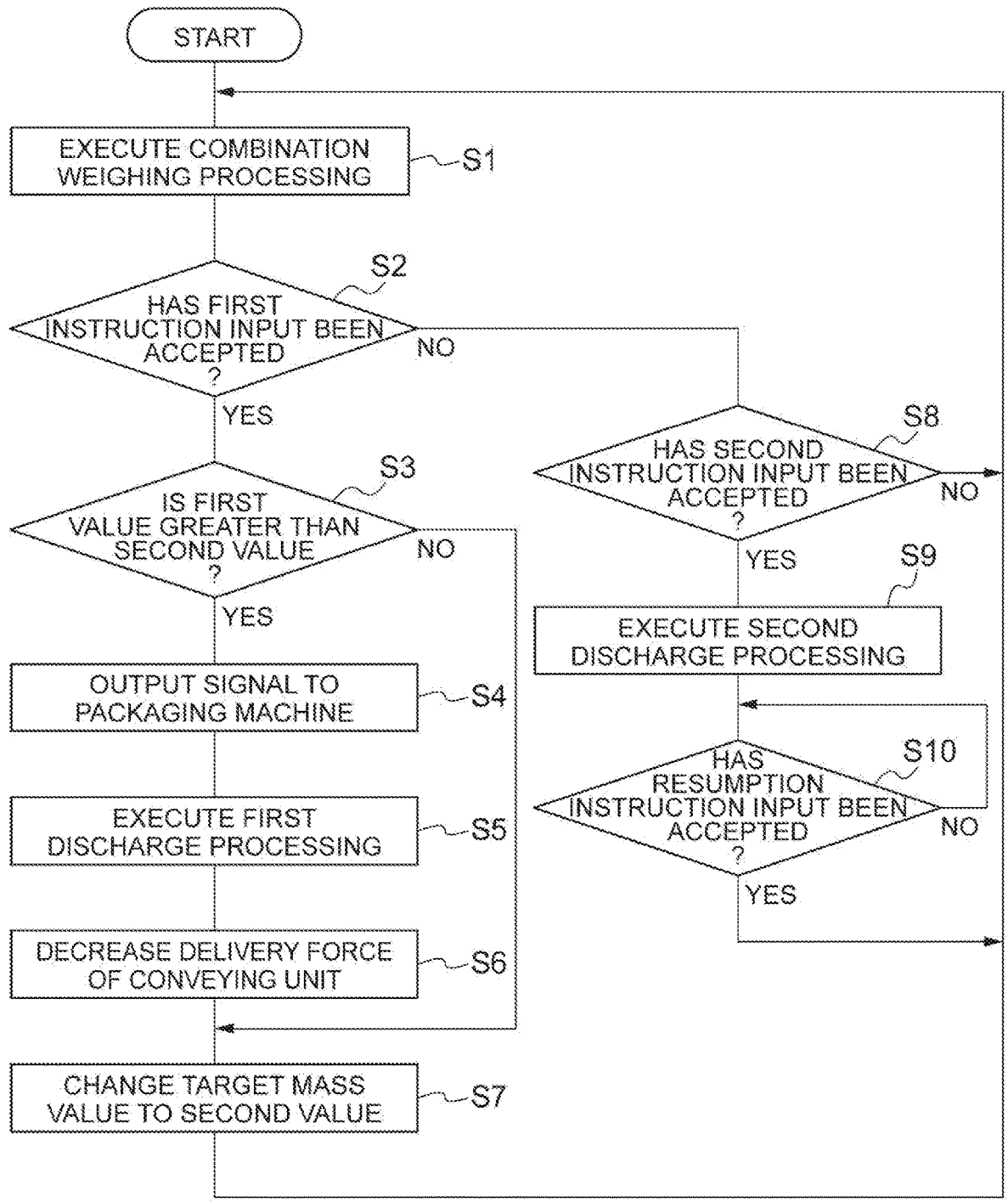
FIG. 2 is a flowchart illustrating processing executed in the combination weighing apparatus illustrated in FIG. 1.

Processing executed in the combination weighing apparatus 1 will be described below with reference to FIG. 2. A first instruction input, a second instruction input, a resumption instruction input, and the like to be described below are input to the control unit 20 via an input unit (not illustrated) of the combination weighing apparatus 1. This input unit is a man-machine interface unit such as a touch panel accepting an input relating to an instruction from a user.

After the initiation of the operation of the combination weighing apparatus 1, the control unit 20 executes the combination weighing processing (Step S1). During the execution of the combination weighing processing, the control unit 20 determines whether or not the input unit has accepted the first instruction input for changing the target weighing value from a first value (current value) to a second value with the type of the article A remaining the same (Step S2). The processing proceeds to Step S3 when it is determined as a result of the determination that the first instruction input has been accepted (YES in Step S2). The processing proceeds to Step S8 when it is determined that the first instruction input has not been accepted (NO in Step S2).

In Step S3, the control unit 20 determines whether or not the first value is less than the second value. The processing proceeds to Step S4 when it is determined as a result of the determination that the first value is less than the second value (YES in Step S3). The processing proceeds to Step S7 when it is determined that the first value is greater than the second value (NO in Step S3).

In Step S4, the control unit 20 outputs a signal to the bag-making packaging machine 60, the signal indicating that the article is discharged from all of the pool hoppers 5, all of the weighing hoppers 6, all of the booster hoppers 7, and the timing hopper 9 (hereinafter, these hoppers will also be referred to as "all of the weighing hoppers 6, the booster hoppers 7, and the like"). When the bag-making packaging machine 60 accepts the signal, the bag-making packaging machine 60 molds a bag larger in capacity than when the combination weighing processing is executed such that, for example, the article A discharged from all of the weighing hoppers 6, the booster hoppers 7, and the like is packaged.

Subsequently, the control unit 20 executes first discharge processing (Step S5) for controlling all of the weighing hoppers 6, the booster hoppers 7, and the like so as to discharge the article A while leaving the article A in the distribution feeder 3 and the radiation feeder 4. During the first discharge processing, for example, the control unit 20 controls distribution feeder 3 and the radiation feeder 4 so as to stop and controls all of the pool hoppers 5, all of the weighing hoppers 6, all of the booster hoppers 7, and the timing hopper 9 so as to sequentially discharge the article A in a state where the transport conveyor 50 is stopped. The control unit 20 may control them so that the article A is sequentially discharged from the hopper disposed on the upper side as described above or sequentially discharged from the hopper disposed on the lower side on the contrary. As a result, the article A discharged from all of the weighing hoppers 6, the booster hoppers 7, and the like is appropriately processed after being packaged in the bag-making packaging machine 60. The control unit 20 may cause the timing of the discharge of the article A to vary among the plurality of weighing hoppers 6 and/or the plurality of booster hoppers 7 in the first discharge processing so that the article A does not stay in the collecting chute 8 in a clogged state after being discharged all at once from all of the weighing hoppers 6, the booster hoppers 7, and the like.

Subsequently, the control unit 20 changes the delivery force of the distribution feeder 3 and the radiation feeder 4 to a value decreased from a case where the combination weighing processing is executed with the first value used as the target weighing value (Step S6). Subsequently, the control unit 20 changes the target weighing value from the current first value to the second value (Step S7). Subsequently, the control unit 20 returns to Step S1 and executes the combination weighing processing with the second value used as the target weighing value.

In Step S8, the control unit 20 determines whether or not the input unit has accepted the second instruction input for changing the type of the article A. The processing proceeds to Step S9 when it is determined as a result of the determination that the second instruction input has been accepted (YES in Step S8). The processing returns to Step S1 and the combination weighing processing continues to be performed when it is determined that the second instruction input has not been accepted (NO in Step S8).

In Step S9, the control unit 20 executes second discharge processing (total discharge processing) for controlling the distribution feeder 3, the radiation feeder 4, and all of the weighing hoppers 6, the booster hoppers 7, and the like so as to discharge the article A. During the second discharge processing, for example, the control unit 20 controls the distribution feeder 3, the radiation feeder 4, and all of the weighing hoppers 6, the booster hoppers 7, and the like to discharge the article A by controlling all of the weighing hoppers 6, the booster hoppers 7, and the like so as to discharge article A while controlling the distribution feeder 3 and the radiation feeder 4 so as to conveying the article A in a state where the transport conveyor 50 is stopped.

Subsequently, the control unit 20 determines whether or not the input unit has accepted the resumption instruction input for resuming the combination weighing processing (Step S10). The processing returns to Step S1 and the combination weighing processing is resumed when it is determined as a result of the determination that the resumption instruction input has been accepted (YES in Step S10). The control unit 20 executes the processing of Step S10 again when it is determined that the resumption instruction input has not been accepted (NO in Step S10). Cleaning of the distribution feeder 3, the radiation feeder 4, and all of the weighing hoppers 6, the booster hoppers 7, and the like is performed by, for example, a worker until the resumption instruction input is input after the execution of the total discharge processing in Step S9. In addition, when an instruction input for stopping the operation of the combination weighing apparatus 1 is accepted during the serial processing, the control unit 20 terminates the processing and stops the operation of the combination weighing apparatus 1.

The function and effect of the combination weighing apparatus 1 will be described below.

In the combination weighing apparatus 1, when the second value is less than the first value (YES in Step S3) in a case where the target weighing value is changed from the first value to the second value (YES in Step S2), the first discharge processing is executed (Step S5) so that all of the weighing hoppers 6, the booster hoppers 7, and the like discharge the article A with the article A remaining in the distribution feeder 3 and the radiation feeder 4. As a result, the article A remaining in the distribution feeder 3 and the radiation feeder 4 can be used when the combination weighing processing is resumed with the second value used as the target weighing value. Therefore, with the combination weighing apparatus 1, the loss of the article A can be reduced in a case where the target weighing value is changed to a value less than the current value.

Especially, the first discharge processing is executed (Step S5) in the combination weighing apparatus 1, so that all of the weighing hoppers 6, the booster hoppers 7, and the like discharge the article A with the article A remaining in the distribution feeder 3 and the radiation feeder 4, when the second value is less than the first value (YES in Step S3) in a case where the target weighing value is changed from the first value to the second value with the type of the article A remaining the same (YES in Step S2). As a result, the loss of the article can be reduced in a case where the target weighing value is changed to a value less than the current value with the type of the article remaining the same.

In a case where the target weighing value is changed to a value greater than the current value, the article A that is suitable for the relatively small pre-change target weighing value is stored in the weighing hopper 6, the booster hopper 7, and the like, and thus an appropriate weighing value combination can be selected even in a case where the combination weighing processing is executed with a value greater than the current value used as the target weighing value. In this regard, in the combination weighing apparatus 1, the combination weighing processing is executed with the second value used as the target weighing value and without executing the first discharge processing being executed (Steps S1 and S7) when the second value is greater than the first value (NO in Step S3) in a case where the target weighing value is changed from the first value to the second value (YES in Step S2). As a result, the combination weighing apparatus 1 is capable of using the article A remaining in the distribution feeder 3 and the radiation feeder 4 and the article A stored in the weighing hopper 6, the booster hopper 7, and the like when the combination weighing processing is resumed with the second value used as the target weighing value.

In the combination weighing apparatus 1, the second discharge processing is executed (Step S9), so that the distribution feeder 3, the radiation feeder 4, and all of the weighing hoppers 6, the booster hoppers 7, and the like discharge the article A, in a case where the type of the article A is changed (YES in Step S8), and then the combination weighing processing is executed (Step S1). As a result, cleaning of, for example, the distribution feeder 3, the radiation feeder 4, and all of the weighing hoppers 6, the booster hoppers 7, and the like can be performed in a case where the type of the article A is changed, and thus the combination weighing apparatus 1 is capable of suppressing mixing between different types of the articles A. In other words, discharge operations according to the situation can be performed by setting the first discharge processing and the second discharge processing distinctively as described above.

In the combination weighing apparatus 1, a signal for packaging the article A discharged from all of the weighing hoppers 6, the booster hoppers 7, and the like is output to the bag-making packaging machine 60 (Step S4) when the second value is less than the first value in a case where the target weighing value is changed from the first value to the second value. Accordingly, the article A discharged from all of the weighing hoppers 6, the booster hoppers 7, and the like can be packaged in the bag-making packaging machine 60. As a result, the article A can be processed with ease in a packaged state and workability can be improved.

In the combination weighing apparatus 1, the combination weighing processing is executed with the second value used as the target weighing value, after the delivery force of the distribution feeder 3 and the radiation feeder 4 is decreased (Step S6) from a case where the combination weighing processing is executed with the first value used as the target weighing value, when the second value is less than the first value in a case where the target weighing value is changed from the first value to the second value. As a result, the article A can be conveyed to the weighing hopper 6 by an appropriate amount in accordance with the second value.

Although one embodiment of the present disclosure has been described above, an aspect of the present disclosure is not limited to the above-described embodiment. For example, the conveying unit according to an aspect of the present disclosure is not limited to the distribution feeder 3 and the plurality of radiation feeders 4 described above and may be one that has a configuration capable of conveying the article. In addition, the plurality of hoppers according to an aspect of the present disclosure are not limited to those arranged in an ring shape such as the plurality of weighing hoppers 6 and the plurality of booster hoppers 7 described above and may be those arranged in a matrix shape. In addition, the combination weighing apparatus according to an aspect of the present disclosure may not be provided with the plurality of booster hoppers 7 and may not be provided with the plurality of pool hoppers 5 and/or the timing hopper 9.

Although the first instruction input, the second instruction input, or the like is input via the input unit in the embodiment described above, a signal corresponding thereto may be input from the bag-making packaging machine 60 or may be input from another higher system or the like instead. In these cases, the input unit may not be provided. In the embodiment described above, the signal for packaging the article A discharged from all of the weighing hoppers 6, the booster hoppers 7, and the like is directly output from the combination weighing apparatus 1 to the bag-making packaging machine 60. Alternatively, the signal may be indirectly output via a higher system or the like. In the embodiment described above, the bag for packaging the article A discharged from all of the weighing hoppers 6, the booster hoppers 7, and the like is molded in the bag-making packaging machine 60. Alternatively, the packaging may be performed with a plurality of divided bags. In addition, the signal may not be output to the bag-making packaging machine 60. In this case, the article A discharged from all of the weighing hoppers 6, the booster hoppers 7, and the like may be received with, for example, a container prepared by a worker and appropriately processed.

In the embodiment described above, the first discharge processing may still be executed when the second value is greater than the first value in a case where the target weighing value is changed from the first value to the second value with the type of the article A remaining the same. Also, the combination weighing processing may be executed with the second value used as the target weighing value without decreasing the delivery force of the distribution feeder 3 and the radiation feeder 4 from a case where the combination weighing processing is executed with the first value used as the target weighing value when the second value is greater than the first value in a case where the target weighing value is changed from the first value to the second value with the type of the article A remaining the same. In addition, the second discharge processing may not be executed in a case where the type of the article A is changed. Conceivable in this case is, for example, a worker removing the article A stored in each part.

In the embodiment described above, the first discharge processing may be executed when a spice relating to seasoning is changed with the shape of the article A such as snack food remaining the same and the second value is greater than the first value in a case where the target weighing value is changed from the first value to the second value. Alternatively, the first discharge processing may be executed when the size of the article A such as meat is changed and the second value is greater than the first value in a case where the target weighing value is changed from the first value to the second value.

In Step S5 of the embodiment described above, the control unit 20 may control the weighing hopper 6, the booster hopper 7, and the like consistent with a preset condition so as to discharge the article A while leaving the article A in the distribution feeder 3 and the radiation feeder 4, as the first discharge processing. For example, the control unit 20 may select the weighing hopper 6, the booster hopper 7, and the like for discharging the article A based on comparison between a reference weighing value set for the weighing hopper 6 and/or the booster hopper 7 and the weighing value of the weighing hopper 6 and/or the booster hopper 7 in a case where the target weighing value is the second value. More specifically, for example, the control unit 20 may control the weighing hopper 6 and/or the booster hopper 7 with a weighing value greater than the reference weighing value, the pool hopper 5 corresponding to the weighing hopper 6 and/or the booster hopper 7, and the timing hopper 9 so as to discharge the article A. The reference weighing value is, for example, the value that is obtained by dividing the target weighing value by the number of the weighing hoppers 6 and/or the booster hoppers 7 combined in the combination weighing processing. In this modification example also, the article A remaining in the distribution feeder 3 and the radiation feeder 4 and the article A stored in the weighing hopper 6, the booster hopper 7, and the like not discharging the article A can be used when the combination weighing processing is resumed with the second value used as the target weighing value. Accordingly, the loss of the article A can be reduced in a case where the target weighing value is changed to a value less than the current value. The condition for the selection of the weighing hopper 6 and/or the booster hopper 7 discharging the article A is not limited to the above and any condition may be set as the condition. For example, even in a case where the weighing hopper 6 and/or the booster hopper 7 with a weighing value greater by a predetermined value or more than the reference weighing value is present, the control unit 30 may allow the article A to remain in the weighing hopper 6 and/or the booster hopper 7 with the weighing value greater by the predetermined value or more than the reference weighing value when the weighing hopper 6 and/or the booster hopper 7 with a weighing value less by the predetermined value or more than the reference weighing value is present.

REFERENCE SIGNS LIST

1: combination weighing apparatus, 3: distribution feeder (conveying unit), 4: radiation feeder (conveying unit), 6: weighing hopper (hopper), 7: booster hopper (hopper), 11: weighing unit, 20: control unit, A: article.

The invention claimed is:

1. A combination weighing apparatus comprising:
a conveying unit that conveys an article;
a plurality of hoppers that temporarily store the article conveyed by the conveying unit;
a weighing unit that weighs a weighing value corresponding to the mass of the article stored in the hopper; and
a control unit that executes combination weighing processing for selecting a weighing value combination, such that a total value becomes a target weighing value, from a plurality of the weighing values weighed by the weighing unit and associated respectively with the plurality of hoppers and controlling the hopper corresponding to the combination so as to discharge the article,
wherein the control unit executes the combination weighing processing with a second value used as the target weighing value after controlling all of the hoppers so as to discharge the article while leaving the article in the conveying unit when the second value is less than a first value in a case where the target weighing value is changed from the first value to the second value.

2. The combination weighing apparatus according to claim 1, wherein the control unit controls all of the hoppers so as to discharge the article while leaving the article in the conveying unit when the second value is less than the first value in a case where the target weighing value is changed from the first value to the second value with the type of the article remaining the same.

3. The combination weighing apparatus according to claim 1, wherein the control unit executes the combination weighing processing with the second value used as the target weighing value when the second value is greater than the first value in a case where the target weighing value is changed from the first value to the second value.

4. The combination weighing apparatus according to claim 1, wherein the control unit executes the combination weighing processing after controlling the conveying unit and all of the hoppers so as to discharge the article in a case where the type of the article is changed.

5. The combination weighing apparatus according to claim 1, wherein the control unit outputs a signal for packaging the article discharged from all of the hoppers, to a packaging machine that packages the article discharged from the hopper corresponding to the combination when the second value is less than the first value in a case where the target weighing value is changed from the first value to the second value.

6. The combination weighing apparatus according to claim 1, wherein the control unit executes the combination weighing processing with the second value used as the target weighing value after decreasing a delivery force of the conveying unit from a case where the combination weighing processing is executed with the first value used as the target weighing value when the second value is less than the first value in a case where the target weighing value is changed from the first value to the second value.

7. A combination weighing apparatus comprising:
a conveying unit that conveys an article;
a plurality of hoppers that temporarily stores the article conveyed by the conveying unit;
a weighing unit that weighs a weighing value corresponding to the mass of the article stored in the hopper; and
a control unit that executes combination weighing processing for selecting a weighing value combination, such that a total value becomes a target weighing value, from a plurality of the weighing values weighed by the weighing unit and associated respectively with the plurality of hoppers and controlling the hopper corresponding to the combination so as to discharge the article,
wherein the control unit executes the combination weighing processing with a second value used as the target weighing value after controlling the hoppers consistent with a preset condition so as to discharge the article while leaving the article in the conveying unit when the second value is less than a first value in a case where the target weighing value is changed from the first value to the second value.

8. The combination weighing apparatus according to claim 7, wherein the control unit selects the hopper for discharging the article based on comparison between a reference weighing value set for the hopper in a case where the target weighing value is the second value and the weighing value of the hopper when the second value is less than the first value in a case where the target weighing value is changed from the first value to the second value.

* * * * *